ABSTRACT OF THE DISCLOSURE

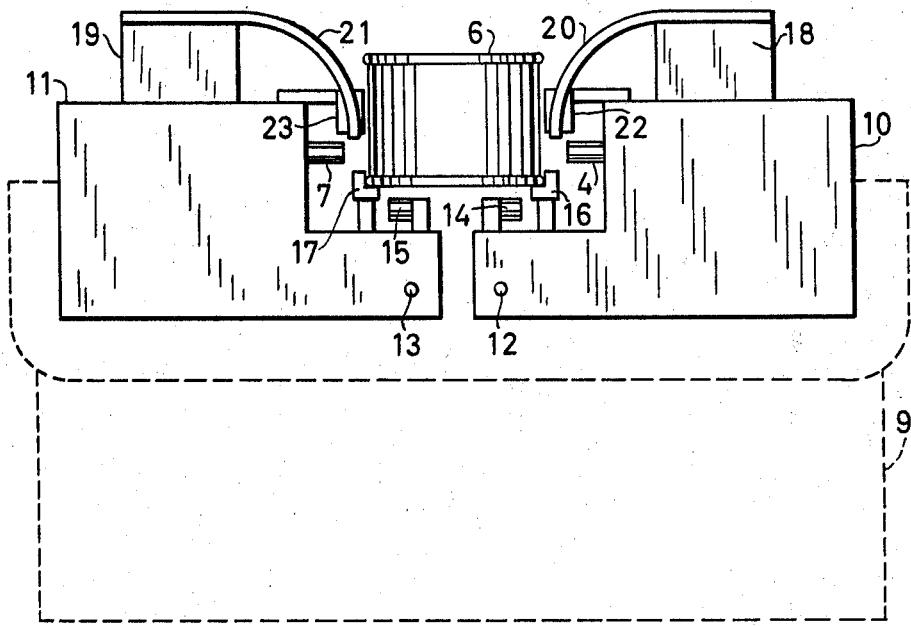
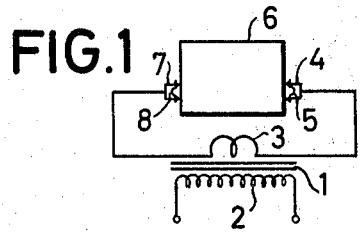
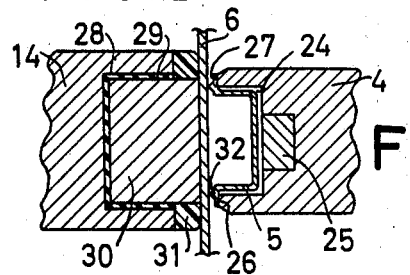
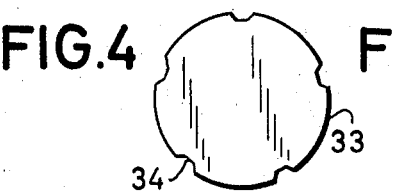
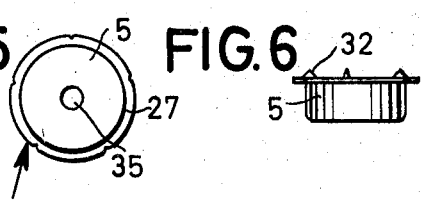
INVENTOR
BENT WERDELIN LARSEN 3,476,905
WELDING OF MOUNTINGS ON HOLLOW SHEET-METAL BODIES
Bent Werdelin Larsen, 8 Ordrupgardsvej, Charlottenlund, Denmark
Filed June 16, 1966, Ser. No. 557,984
Int. Cl. B23k 11/10, 11/14
U.S. Cl. 219—93                              6 Claims

A welding machine and method for projection welding a pair of sheet metal bail ears to the side walls of a sheet metal container which may have a protective coated outer surface. The ears are formed with a narrow flange having a plurality of sharp projections adapted to penetrate this exterior protective coating. A pair of welding electrodes are series connected with each electrode disposed to receive the ear and to support the flange and the sharp projections as the electrodes are advanced toward the container. The advance of the electrodes is stopped when the projections of the ear establish an electrical conductive condition with the container side wall, whereupon the ears are welded to the container by using a fraction of a cycle of welding current.

---

This invention is concerned with the welding of mountings on hollow sheet-metal bodies or containers.

The hollow sheet-metal bodies may, for example, be tins or pails of sheet-metal, preferably tinplate, and the mountings to be welded on these bodies are sheet metal bail ears primarily intended for accommodating handles or the like carrying means.

DESCRIPTION OF THE PRIOR ART

For the purpose of attaching handle mountings to metal tins, the procedures heretofore generally applied comprises riveting, soldering, seaming, or spot welding.

The riveting process is encumbered with the drawback that the wall of the tin must be provided with through holes which may be difficult to seal completely again to make the container fluid tight. Moreover, the riveting process requires that the mountings are provided with relatively wide flanges. The soldering process requires free areas in any protective coating and/or in a possible external ornamentation; and riveting as well as soldering requires the use of additional material which increases the cost of production. The seaming process, which is a comparatively complex one, requires that the sheet-material be possessed of specific qualities and further results in the inner surface of the container being smooth no longer. The most notable disadvantage of spot welding, which also requires a relatively wide flange formed on the ear, is that the welding electrodes absorb tin or like metal from the coated sheet-material of the container and the mountings or ears. To maintain an efficiency in spot-welding apparatus the electrodes must be cleaned frequently. To this should be added that no paint should be applied to such parts of the sheet-metal bodies where spot welding is to be carried out or, that a protective or ornamental layer, if such is already present, must be penetrated before spot welding can be carried out. Subsequent to the spot welding process, it may be necessary to subject said containers and applied ears to an aftertreatment with a view to restoring the protection.

It is an object of the invention to provide a welding method where the welding electrodes are only slightly impurified by tin.

It is also an object of the invention to prevent a protective layer, if such layer is provided on the inside of the metal body or container, from being entirely penetrated.

It is another object of the invention to avoid the use of any additional material for attaching bail ears to container bodies which increases the cost of production.

It is still another object of the invention to avoid a special process for the penetration of an ornamental or protective coating, where such coating is present, at the outside of the metal body or container, and to avoid the requirement for free areas in an external ornamentation or coating.

It is yet another object of the invention to avoid the necessity of using a special material for the metal body, for example deep-drawing quality, and to avoid penetration of the wall of the metal body.

SUMMARY OF THE INVENTION

These objects are generally attained by using a mounting or bail ears which on the side that is to face the metal body is provided with sharp projections, and by the mounting or bail ears being attached to the sheet metal body of the container by means of a series projection welding where the welding current is supplied to one of two opposite mountings or ears and carried away from the other, the welding current flowing between the electrically conductively engaged mountings or ears through the material of the sheet metal body.

Other objects and features of the present invention will appear from the following description in conjunction with the accompanying diagrammatical drawing.

BRIEF DESCRIPTION OF THE DRAWINGS

FIG. 1 shows a circuit diagram of a welding process according to the invention,

FIG. 2 is an embodiment of a welding machine for use in connection with this welding process, FIG. 3 is, on a larger scale, a section through a welding electrode with a mounting or ear carried therein, a wall of the container and a back-up disposed opposite to the welding electrode, FIG. 4 is an example of a punched blank for use in the production of a mounting or ear, FIG. 5 is a mounting or ear produced by forming a blank as shown in FIG. 4, and FIG. 6 is the mounting or ear shown in FIG. 5 viewed in the direction of the arrow in FIG. 5.

DESCRIPTION OF THE PREFERRED EMBODIMENT

The welding current circuit arrangement diagrammatically shown in FIG. 1 includes a transformer 1, the primary winding 2 of which is in a manner not shown connected to a current source, for example an A.C. mains, preferably via adequate switching means for short current periods. One terminal of the secondary winding 3 of the transformer is connected with a welding electrode 4 being in engagement with a handle mounting or ear 5 to be welded on a hollow steel sheet body 6, for example a metal tin plated for paint, oil, marmalade, or the like products. Opposite the electrode 4 there is a second electrode 7 which is in engagement with another handle mounting or ear 8. The electrode 7 is connected with the other terminal of the secondary winding 3.

When welding is to be carried out, the two mountings or ears 5 and 8 are by means of the electrodes 4 and 7 pressed against the outside of the metal body 6, and the current source is connected with the primary winding 2 of the transformer. This results in the establishment of a welding current circuit which extends from the right-hand terminal of the secondary winding 3 through the electrode 4 and the handle mounting or ear 5 to the metal body 6 where the current flows in the wall of the metal body to the other handle mounting 8 and from there through the electrode 7 to the left-hand terminal of the secondary winding 3. This welding process which may be designated as a series projection welding permits welding current to enter the container from an outside first ear and to then flow through the container body and to and out the outside other ear. This series flow of current does not destroy any protective coating on the interior of the container. In spot welding the current must flow from one side to the other side of the sheet metal, which current flow completely destroys any interior protective coating.

FIG. 2 shows a machine for carrying out the welding process described with reference to FIG. 1.

The machine comprises a frame 9 indicated in dashed lines wherein two welding units 10 and 11 are so disposed as to be displaceable towards and away from one another.

The two units may for example be connected to a common spindle with opposite threads on its two halves so that said units move towards one another when the spindle is rotated in one direction and away from one another when the spindle is rotated in the opposite direction.

The units 10 and 11 may also be swung through small angles about axes of rotation 12 and 133, and they can be maintained in the desired positions with the help of means not shown. This angular adjustment of the units may be desirable where welding is to be performed on conical metal bodies.

The units 10 and 11 each carry one of the welding electrodes 4 and 7 the specific construction of which will be explained below in conjunction with the description of FIG. 3.

Since the sheet metal body 6 on which the mountings are to be welded, generally is of a comparatively thin-walled material, and since during the welding process a comparatively high pressure must be exerted on the outside of the body, the units are so designed that each of the welding electrodes is one jaw of a pair of tongs, the other jaw of which is constituted by a back-up 14 and 15, respectively. This pair of tongs is operated by an actuating member, for example a hydraulic or pneumatic cylinder, built into the unit, and each unit is preferably so designed that the actuating member first moves the back-up upwards and inwards towards the inner wall of the metal body until it engages a stop which is so disposed that the back-up approximately just touches the inside of the metal body, after which the electrode and the mounting retained therein are advanced to engage the outside of the metal body. Since the electrode and the back-up are pressed against the wall of the body with substantially the same force—in that they are actuated by one and the same cylinder—the wall of the metal body is only exposed to the deformation required for establishing the welding.

The metal body is supported on angular and insulated rails 16 and 17 and is fixed in the longitudinal direction of said rails by means not shown, which means may be automatically operated.

The mountings or ears to be welded on the sheet metal body are fed from two sorting units 18 and 19 disposed on the units 10 and 11, which sorting units communicate with channels or ear guide means 20 and 21, respectively, through which the mountings or ears are supplied to feeding stations located before the weld points, which stations in FIG. 2 are designated by 22 and 23, respectively, and are so arranged that when the feeding station is activated the leading mounting or ear guide in the channel is passed out through the opening of the channel and placed in the welding electrode.

The welding machine described may be more or less automated. The machine may, for example, be so arranged that the metal body 6 on which the mountings are to be welded, is manually placed in the proper position on the rails 16 and 17 whereafter a starter switch is operated. The operation of the starter switch results in the following processes being automatically carried out: the leading mounting in each channel 20 and 21 is fed to the respective welding electrode 4 and 7, the two backups 14 and 15 are actuated to engage the above-mentioned stops, the two welding electrodes 4 and 7 are moved forward until the mountings present in the electrodes engage the outside of the metal body, the back-up and associated welding electrode 4, 14 and 7, 15 respectively, are pressed against one another at the required welding pressure, welding current is supplied, back-ups and welding electrodes are returned to their intial positions, and the metal body is ejected from the apparatus. The machine may also be combined with an apparatus which automatically places the metal bodies in their proper positions on the rails whereafter the above processes are automatically initiated. In this case a fully automatic machine is attained.

The timing of the above-described processes is preferably such that the full pressures exerted by the back-up and the welding electrode on the inside of the metal body and the mounting, respectively, are maintained for a certain time before the welding current is supplied, which has for its purpose to ensure that proper electrical contact is established between the mounting and the metal body at the moment when the current is supplied. The said pressures are furthermore maintained for a certain time after the welding current has ceased to flow which has for its purpose to ensure that the material melted during the welding process gets time to solidify before the pressures are relieved.

The welding current is supplied only during a very short time, preferably only a fraction of one cycle of the A.C. mains voltage. This ensures local heating of the weld and, consequently, contributes to reducing the deposit of tin on the electrode and to reducing, to the greatest possible extent, any damage caused by heating to a protective layer, if such is provided, on the inside of the metal body.

FIG. 3 shows part of the wall of the metal body 6 and part of the back-up 14 and the welding electrode 4 in the positions which said parts assume immediately before the welding current is supplied. The welding electrode 4 which preferably consists of a copper alloy, is provided with a recess 24, and at the bottom of this recess a permanent magnet 25 is embedded in the material of the electrode, which magnet 25 causes a handle mounting 5 arriving from channel 20 and fed by station 22 to be inserted into and retained in the recess 24, the shape of which is adapted to conform with that of the mounting in such a way that the edge 26 of the electrode 4 rests against a flange 27 on the mounting 5.

The back-up 14 which, for example, may consist of an aluminium alloy of great strength, is provided with a recess 28 in which there is inserted a cup-shaped portion 29 of insulating material. In the cup there is inserted a cylindrical copper block 30 which, consequently, is insulated with respect to the main portion of the back-up 14 proper and serves as a heat accumulator for rapid heat dissipation from the weld. Consequently, this arrangement also contributes to preventing a possible protective layer on the inside of the metal body from being seriously damaged. The extreme portion of the block 30 is surrounded by a ring 31 of insulating material, preferably nylon. This ring has for its object to prevent part of the welding current from the welding electrode from flowing directly through the wall of the metal body 6 to the copper block 30 and from there again into the wall of the metal body at part of the block wall which, if the ring 31 was not present, would be pressed against the inner wall of the metal body 6 with particularly great force. If the current was permitted to flow in this way, this would also result in damage being caused to a possible protective layer.

As will appear from FIG. 3 and as will also be particularly explained below, the mounting 5 to be welded on the metal body 6 is at the side intended to face the metal body, provided with a plurality of sharp projections 32. These projections have for their purpose to concentrate the welding current on a few points whereby local heating is attained so that the welding current can be limited to quite a short period which, as already mentioned, results in reduced deposit of tin on the welding electrode and less damage being caused to a protective layer on the inside of the metal body. The sharp projections have also for their purpose to penetrate a protective or ornamental layer at the outside of the metal body so that a proper electrical connection is already ensured when the welding current is supplied.

FIG. 4 shows an example of a blank 33 for use in the production of a mounting 5 which is intended for being welded on a metal body 6. The blank which has been punched from a thin metal sheet, preferably tinplated sheet steel, is provided with recesses 34 at the places corresponding to the projections 32 of the completed mounting. The number of projections may vary.

FIGS. 5 and 6 show a mounting produced by forming the blank 33, and viewed from the end intended to face away from the metal body 6, and from the side, respectively. The projections 32 are constituted by excess material from the forming operation, and as a consequence of the recesses 34, the projections 32 will be located at a certain distance from the extreme edge of the flange 27 which means that the welds will be entirely concealed under the flange 27 and thus exert no visibly destructive influence on an external ornamentation of the metal body 6. The recesses 34 will also result in the projections 32 becoming very sharp. It is further of essential importance that the height of the projections is so adapted as to permit the projections to melt entirely away at current periods of about 1/100 sec. or less.

It is also possible to produce applicable mountings on the basis of a round blank without recesses, but the visible result as well as the reliability of the welding will be less satisfactory than with a blank having recesses as above described, notably where small mountings are concerned.

The mountings or ears here shown are intended for accommodating handles which are preferably U-shaped wire bails, and they are, therefore expediently provided with a hole 35 simultaneously with the forming.

The invention is not limited to the embodiments here shown and described but may in different ways be modified within the scope of the patent claims hereto annexed.

What is claimed is:

1. A welding machine for welding mountings on hollow metal bodies, comprising first and second opposite welding electrodes, a welding transformer having a primary winding and a secondary winding, means for connecting said primary winding to a source of electric energy, means connecting said first welding electrode to one end of said secondary winding and means connecting said second welding electrode to the other end of said secondary winding, means for supplying said mountings one by one to said first and second welding electrodes, means for pressing said first and second welding electrodes towards said hollow metal body with one of said mountings located between each of said welding electrodes and said hollow metal body, and first and second back-ups associated with said first and second welding electrodes respectively, means for maintaining during welding said back-ups in positions in which they engage the wall of said hollow metal body opposite the welding areas, and means for electrically isolating the surfaces of said back-ups which are to engage the wall of said hollow metal body during welding, from said first and second welding electrodes.

2. A welding machine as claimed in claim 1, comprising a first pair of tongs of which the jaws carry said first welding electrode and said first back-up respectively, a second pair of tongs of which the jaws carry said second welding electrode and said second back-up respectively, and actuating means for said first and second pairs of tongs.

3. A welding machine as claimed in claim 1, comprising a first pair of tongs of which the jaws carry said first welding electrode and said first back-up respectively, a second pair of tongs of which the jaws carry said second welding electrode and said second back-up respectively, and actuating means for said first and second pairs of tongs, each of said actuating means being so constructed that on actuation, the associated back-up is first moved into its operational position adjacent said wall of said hollow metal body and then the associated welding electrode is moved into its operational position adjacent the opposite side of said wall.

4. A welding machine as claimed in claim 1, in which a portion of each of said back-ups comprising said surface which is to engage the wall of said hollow metal body during welding comprises a solid metal body of a material having good heat transferring and heat accumulating properties, and a ring-shaped body of electrically insulating material surrounding said solid metal body.

5. A method of welding sheet metal bail ears to the side of a sheet metal container including the steps of (a) arranging a pair of bail ears on the opposite sides of a sheet metal container, each ear having a plurality of sharp projections adapted to engage the substantially flat side of the container; (b) advancing each ear and applying pressure to the ear until the projections penetrate the outer surface of the side of the sheet metal container to establish an electrical conductive contact of the ear with said wall; (c) arranging an insulated back up to engage the sheet metal wall opposite the engaged ear to provide support for the side wall against deflection during the advancing of the ear and subsequent welding thereof to the container, and (d) supplying welding current for a series welding cycle whose duration of time is of such a short extent that the welding occurs at only the local projections and with the heat of weld fusion being confined to the several projections and the engaged side of the sheet metal, the weld cycle current passing from one ear to and through the wall of the sheet metal container and from the sheet metal container to and through the other opposite ear.

6. The method of welding sheet metal bail ears to a container as in claim 5 wherein the side wall sheet metal of the container is provided with protective coatings on each surface and wherein the insulated back up includes a heat sink member mounted therein disposed to keep the localized inside side wall area opposite the localized weld at a temperature which is less than the decomposing temperature of the interior protective coating on the side wall.

References Cited
UNITED STATES PATENTS

| | | | |
|---|---|---|---|
| 2,137,909 | 11/1938 | Hagedorn | 219—86 |
| 2,233,526 | 3/1941 | Hagedorn et al. | 219—91 X |
| 2,300,700 | 11/1942 | Porter et al. | 219—91 X |
| 2,845,522 | 7/1958 | Hall | 219—93 |
| 1,190,208 | 7/1916 | Williams | 219—93 |
| 1,670,131 | 5/1928 | Allerton | 219—93 |
| 2,006,458 | 7/1935 | Jones et al. | 219—93 |
| 3,233,073 | 2/1966 | Ruetschi | 219—93 |
| 3,340,379 | 9/1967 | Sweeny | 219—99 |

JOSEPH V. TRUHE, Primary Examiner

P. F. DUGGAN, Assistant Examiner